United States Patent
Lee et al.

(10) Patent No.: US 8,596,133 B2
(45) Date of Patent: Dec. 3, 2013

(54) VERTICAL PRESSURE SENSOR

(75) Inventors: Chul-Sub Lee, Daegu (KR); Young-Deok Kim, Seoul (KR); Eul-Chul Byeon, Gyonggi-Do (KR); Yong Hun Lee, Gyongsangbuk-do (KR)

(73) Assignee: Tyco Electronics Amp Korea Ltd., Kyungsangbuk-Do (KR)

( * ) Notice: Subject to any disclaimer, the term of this patent is extended or adjusted under 35 U.S.C. 154(b) by 0 days.

(21) Appl. No.: 13/446,473

(22) Filed: Apr. 13, 2012
(Under 37 CFR 1.47)

(65) Prior Publication Data
US 2012/0297886 A1 Nov. 29, 2012

Related U.S. Application Data (63) Continuation of application No. PCT/JP2010/006248, filed on Sep. 14, 2010.

(30) Foreign Application Priority Data

Oct. 14, 2009 (KR) .......................... 10-2009-0097862

(51) Int. Cl.
*G01L 9/04* (2006.01)
(52) U.S. Cl.
USPC ............................................. 73/720; 73/726
(58) Field of Classification Search
USPC .................................... 73/700–756
See application file for complete search history.

(56) References Cited

U.S. PATENT DOCUMENTS

| | | | |
|---|---|---|---|
| 4,986,131 A * | 1/1991 | Sugiyama et al. | 73/766 |
| 5,587,535 A | 12/1996 | Sasaki et al. | |
| 5,880,372 A * | 3/1999 | Nasiri | 73/726 |
| 5,932,808 A | 8/1999 | Hayashi et al. | |
| 6,070,469 A * | 6/2000 | Taniguchi et al. | 73/720 |
| 6,105,437 A * | 8/2000 | Klug et al. | 73/756 |
| 6,227,055 B1 * | 5/2001 | Pitzer | 73/715 |
| 7,370,536 B2 | 5/2008 | Ueyanagi et al. | |
| 7,412,894 B2 | 8/2008 | Ueyanagi et al. | |
| 2006/0042394 A1 * | 3/2006 | Kosh et al. | 73/753 |
| 2006/0042395 A1 * | 3/2006 | Lepine et al. | 73/753 |
| 2007/0068269 A1 * | 3/2007 | Lepine et al. | 73/753 |

OTHER PUBLICATIONS

International Search Report, International Application No. PCT/KR2010/006248, dated Sep. 14, 2010, 3 pages.

* cited by examiner

*Primary Examiner* — Andre Allen
(74) *Attorney, Agent, or Firm* — Barley Snyder

(57) ABSTRACT

A vertical pressure sensor having a fluid deforming pressure application unit, a sensor housing, a socket, a circuit board, a plurality of electrode terminals, and a plurality of electrical signal transmitting electrode rods. The pressure application unit includes a diaphragm to which strain gauges are attached. The socket surrounds a circumference of the diaphragm of the pressure application unit and includes a receiving passageway. The plurality of electrode terminals are provided at the upper end of the socket in a Wheatstone bridge circuit pattern. The plurality of electrode terminals protrude from the upper end of the socket to constitute an electrode tip. The circuit board connects to the plurality of electrode terminals to convert a pressure value into an electrical signal, and the plurality of electrode rods are connected to the circuit board to transmit the electrical signal outside.

14 Claims, 6 Drawing Sheets

Prior Art

VERTICAL PRESSURE SENSOR

CROSS-REFERENCE TO RELATED APPLICATIONS

This application is a continuation of PCT International Application No. PCT/JP2010/006248 filed Sep. 14, 2010, which claims priority under 35 U.S.C. §119 to Korean Patent Application No. 10-2009-0097862, filed Oct. 14, 2009.

FIELD OF INVENTION

The invention relates to a sensor and, more particularly, to a vertical pressure sensor capable of measuring pressure transmitted to one end thereof.

BACKGROUND

In a known pressure measuring structure, a diaphragm is generally provided perpendicular to the direction in which pressure is applied such that the diaphragm can be finely elastically deformed due to the pressure applied to the diaphragm, and four strain gauges are attached to the top of the diaphragm so as to convert the elastic deformation of the diaphragm into an electrical signal (generally, a difference in voltage displacement). At this time, the strain gauges are attached to the diaphragm such that the strain gauges are provided in a pair symmetrical with respect to the center of the diaphragm. A Wheatstone bridge circuit formed on a printed circuit board (PCB) accurately calculates a pressure value applied to the diaphragm from the electric signal obtained by the strain gauges.

Generally, a pressure sensor may include an input unit, having a diaphragm, to receive external pressure, a first circuit board electrically connected to strain gauges of the diaphragm to receive an electric signal from the strain gauges and processing the received electric signal using a Wheatstone bridge circuit, and a second circuit board electrically connected to the first circuit board, the second circuit board having a circuit device to transmit a pressure value to a controller provided outside the sensor.

Meanwhile, the size of the pressure sensor may be restricted. For example, a pressure sensor may be mounted to an external signal processing (ESP) module used in an antilock brake system (ABS) for automobiles. As is well known, a solenoid valve, a pump line and the like are densely disposed in the ESP module. The ESP module is filled with a high pressure fluid, which is pulsated to perform braking when the ESP module is driven. The components of the ESP module are disposed as densely as possible so as to reduce the size of the device. In addition, it is necessary to configure a pressure sensor provided to sense pressure of the fluid in the ESP module such that the sectional area of the pressure sensor is limited.

Figure 7:
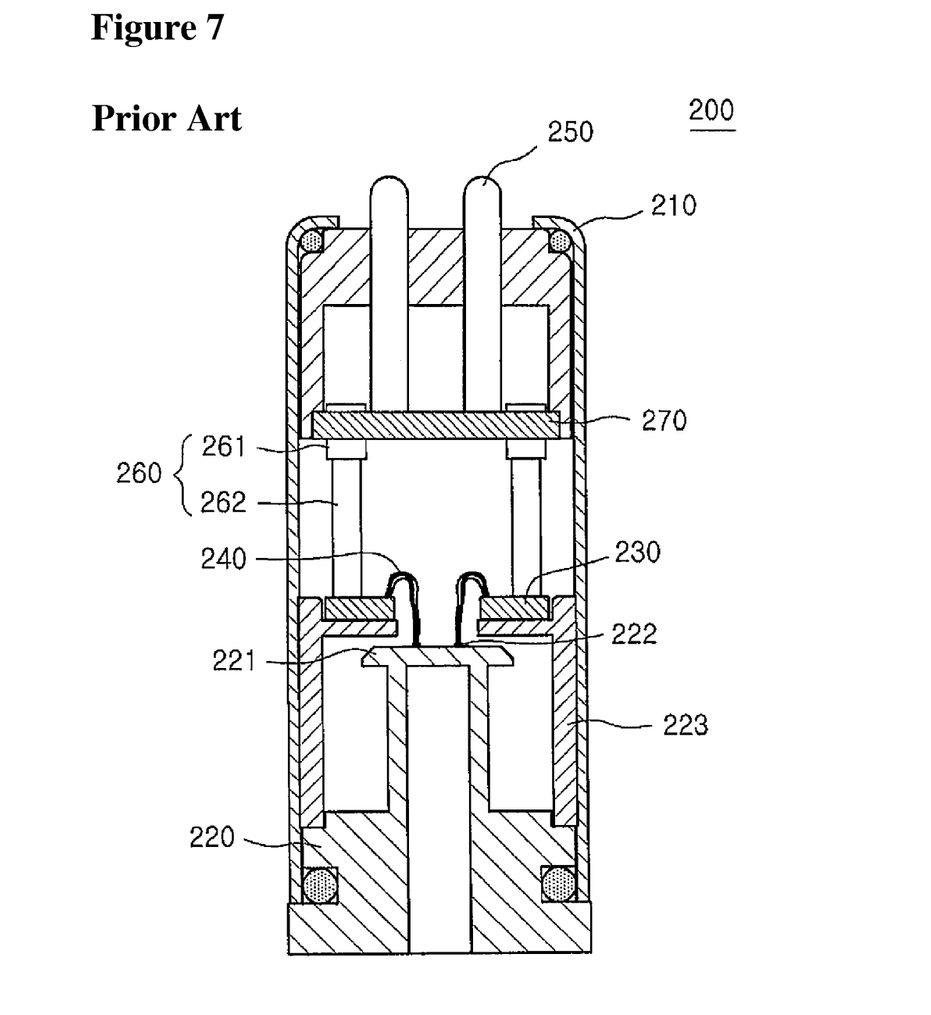
FIG. 7 is a sectional view a known pressure sensor.

Such a pressure sensor is schematically shown in FIG. 7, which is a sectional view illustrating a known pressure sensor.

A diaphragm 221 is disposed at the upper end of an input unit 220, which is coupled to the lower end of a cylindrical casing 210. Four strain gauges 222 are attached to the top of the diaphragm 221. A socket 223, made of metal, is coupled to the upper part of the input unit 220 such that the socket 223 surrounds the input unit 220. A first circuit board 230 having a Wheatstone bridge circuit mounted therein is securely coupled to the upper end of the socket 223.

The strain gauges 222 are electrically connected to the first circuit board 230 by wire bonding such that influence on elastic deformation of the diaphragm 221 is minimized. In this case, the distance between the top of the diaphragm 221, to which the strain gauges 222 are attached, and the first circuit board 230 is restricted such that the distance does not exceed a predetermined value, i.e., such that welding portions are not separated from opposite ends of wires 240, which are inclined, when the relative position between the strain gauges 222 and the first circuit board 230 is changed due to elastic deformation of the diaphragm 221.

Meanwhile, a second circuit board 270 is coupled to the upper end of the cylindrical casing 210. Electrode rods 250 disposed in the pressure sensor 200, where the electrode rods 250 protrude upward from the pressure sensor 200, transmit a pressure value to the outside are electrically connected to the top of the second circuit board 270. The second circuit board 270 includes elastic terminals 260 protruding downward to receive the pressure value generated by the first circuit board 230.

The first circuit board 230 is provided at the center thereof with a receiving passageway through which the strain gauges 222 are connected to the first circuit board 230 by wire bonding. It may be assumed that a plurality of electrode rods are mounted around the receiving passageway of the first circuit board 230 in order for the first circuit board 230 to be directly electrically connected to contact points (not shown) of an ESP module. In this case, the distance between the respective electrode rods is great due to the receiving passageway formed at the center of the first circuit board 230, with the result that the electrode rods may not be aligned with the respective contact points formed at the ESP module. For this reason, the second circuit board 270 is further provided between the first circuit board 230 and the contact points of the ESP module such that the first circuit board and the second circuit board are electrically connected to each other through a plurality of electrode rods disposed at great intervals, and electrical connection between the second circuit board and the ESP module using a plurality of electrode rods densely disposed at the center of the second circuit board. In the known pressure sensor, as described above, the receiving passageway is formed in the first circuit board, and therefore, the first circuit board and the second circuit board are necessary.

Also, each of the elastic terminals 260 includes an outer pipe body 261 having a spring (not shown) mounted therein, the outer pipe body 261 fixedly extending through the second circuit board 270, and an inner pipe body 262 disposed in the outer pipe body 261 such that the inner pipe body 262 can elastically slide upward. The outer pipe body 261 and the inner pipe body 262 are made of a conductive material. When the input unit 220 is inserted into the lower end of the cylindrical casing 210, the elastic terminals elastically move upward to contact an electrical pattern (not shown) formed on the first circuit board 230.

The elastic terminals 260 cannot be fixed to the first circuit board 230 because the distance between the top of the diaphragm and the first circuit board is restricted. That is, if the outer pipe body 261 is placed under the first circuit board 230 so as to securely couple the elastic terminals 260 to the first circuit board 230, the distance between the strain gauges 222 and the first circuit board 230 is excessively increased due to the length of the outer pipe body 261 protruding from the lower end of the first circuit board 230, with the result that welded portions of the wires may not be stably maintained during a designed life span.

In the known pressure sensor, therefore, the first circuit board having the Wheatstone bridge circuit and the second circuit board having a circuit device are separated from each other where the second circuit board is disposed above the first circuit board, and the upper and lower circuit boards are connected to each other using the elastic terminals, due to a restricted area of the pressure sensor.

Since the elastic terminals are used in the known pressure sensor, the distance between the first and second circuit boards is increased so as to provide a space necessary for the elastic terminals to expand and contract, with the result that the vertical length of the pressure sensor is increased.

Also, each of the elastic terminals includes a plurality of components, such as the outer pipe body, the inner pipe body, and the spring, such that the result that assembly efficiency is lowered, and manufacturing costs are increased.

SUMMARY

Therefore, the invention has been made in view of the above problems, and it is an object of the invention, among others, to provide a vertical pressure sensor wherein the sectional area for installation of the vertical pressure sensor is minimized, and assembly efficiency of components of the vertical pressure sensor is improved. A vertical pressure sensor having a fluid deforming pressure application unit, a sensor housing, a socket, a circuit board, a plurality of electrode terminals, and a plurality of electrical signal transmitting electrode rods. The pressure application unit includes a diaphragm to which strain gauges are attached. The socket surrounds a circumference of the diaphragm of the pressure application unit and includes a receiving passageway. The plurality of electrode terminals are provided at the upper end of the socket in a Wheatstone bridge circuit pattern. The plurality of electrode terminals protrude from the upper end of the socket to constitute an electrode tip. The circuit board connects to the plurality of electrode terminals to convert a pressure value into an electrical signal, and the plurality of electrode rods are connected to the circuit board to transmit the electrical signal outside.

DESCRIPTION OF THE DRAWINGS

The above and other objects, features and other advantages of the invention will be more clearly understood from the following detailed description taken in conjunction with the accompanying drawings, in which.

DETAILED DESCRIPTION OF THE EMBODIMENT(S)

Now, an embodiment of the invention will be described in detail with reference to the accompanying drawings. In the following, a detailed description of known functions and configurations incorporated herein will be omitted when it may make the subject matter of the invention rather unclear.

Figure 1:
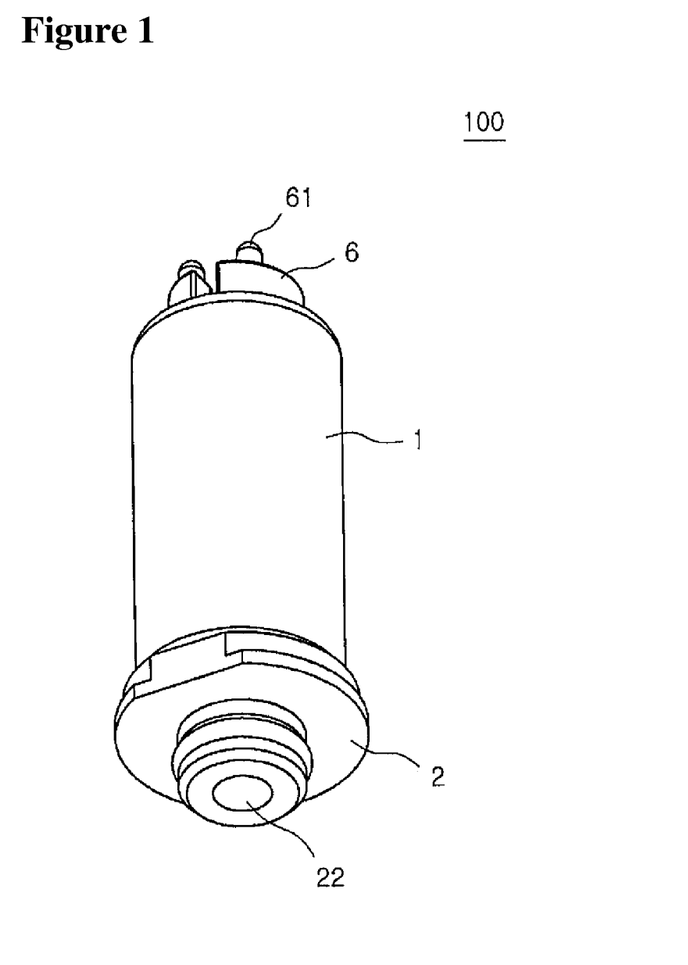
FIG. 1 is a perspective view of a vertical pressure sensor according to the invention.

With reference to FIG. 1, a vertical pressure sensor 100 is shown, having a vertically long shape with a circular cross section. The size of the circular section of the vertical pressure sensor 100 is limited by a mechanical apparatus to which the vertical pressure sensor 100 is mounted. The vertical pressure sensor 100 is disposed at the lower end thereof with a pressure application unit 2 to which pressure is applied. The vertical pressure sensor 100 is disposed at the upper end thereof with an electrode rod 61 protruding upward to transmit an electrical signal corresponding to the pressure applied to the pressure application unit 2 to the outside. The vertical pressure sensor 100 is hermetically sealed to prevent an external fluid from permeating into a sensor housing 1 of the vertical pressure sensor 100.

Figure 2:
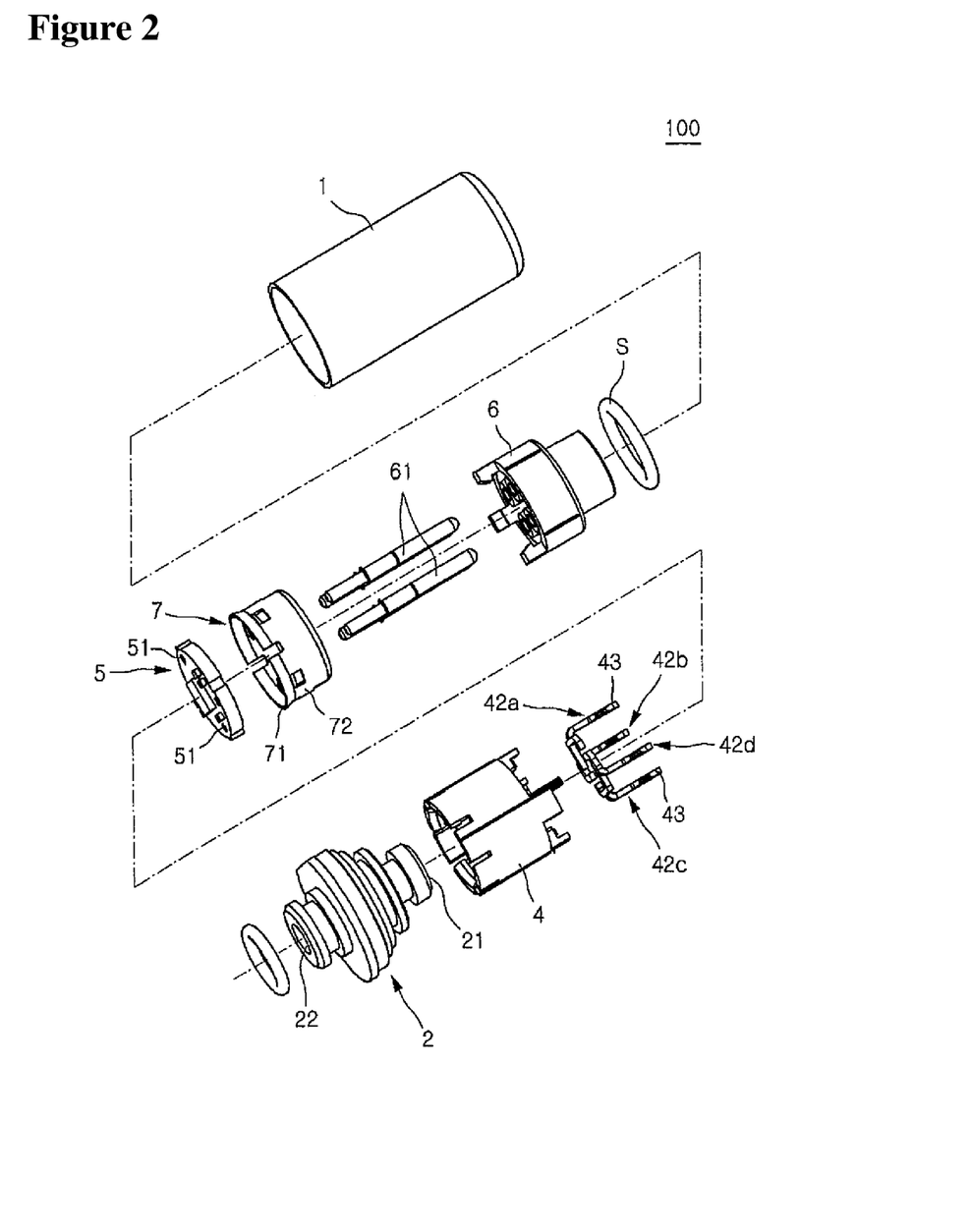
FIG. 2 is an exploded perspective view of the vertical pressure sensor shown in FIG. 1.
Figure 3:
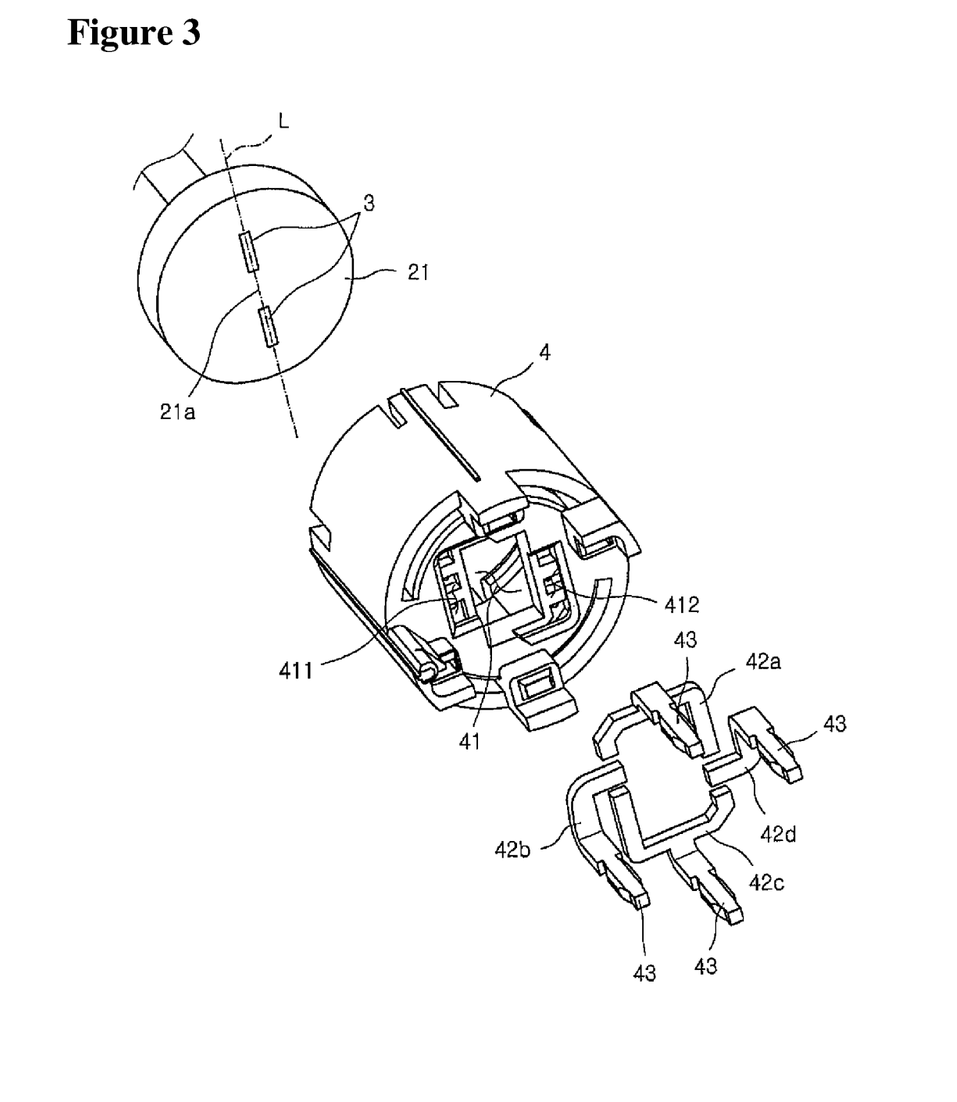
FIG. 3 is a perspective view of a socket and first to fourth electrode terminals of the vertical pressure sensor according to the invention.

As shown in FIGS. 2 and 3, the vertical pressure sensor 100 according to the invention includes a pressure application unit 2 having a diaphragm 21 to which strain gauges 3, a socket 4 formed by insert injection molding such that first to fourth electrode terminals 42a, 42b, 42c, and 42d are mounted in the socket 4, a circuit board 1 connected to the respective electrode terminals to process an electrical signal, and electrode rods 61 connected to the circuit board 5 to transmit the electrical signal to the outside.

The sensor housing 1 constituting the circumference of the vertical pressure sensor 100 is formed of a cylindrical pipe. The sensor housing 1 is made of a conductive material, such as metal, for shielding. Also, the upper end of the sensor housing 1 is bent inward.

The electrode rods 61 is mounted to a rod housing 6, which serves as an insulator, and the circuit board 5 is coupled to the lower end of the rod housing 6 which constitutes the upper structure of the vertical pressure sensor 100. The lower ends of the electrode rods 61 are connected to an output electrode surface (not shown) formed at the top of the circuit board 5. Meanwhile, a shielding shell 7 may be coupled to the lower end of the rod housing 6, and the circuit board 5 may be coupled to the lower end of the shielding shell 7, which will be described later.

The upper structure of the vertical pressure sensor 100 assembled as described above is inserted into the sensor housing 1 from the lower end thereof, and where a sealing member S is disposed between the upper structure of the vertical pressure sensor 100 and the sensor housing 1. The upper ends of the electrode rods 61 protrude from the top of the vertical pressure sensor 100 such that the upper ends of the electrode rods 61 can be coupled to a connector (not shown) of another mechanical apparatus.

Meanwhile, the pressure application unit 2 has a step formed at the outer circumference thereof. The pressure application unit 2 is coupled to the lower end of the sensor housing 1. The diaphragm 21 is formed at the upper end of the pressure application unit 2. The diaphragm 21 is formed of a flat disc. The pressure application unit 2 includes an receiving cavity 22 provided at the lower end thereof, through which an object, such as a fluid, pressure of which is to be measured, moves to the back of the diaphragm 21. The fluid reaches the back of the diaphragm 21 through the receiving cavity 22, and the diaphragm 21 is elastically deformed lightly due to the increase in pressure of the fluid.

Meanwhile, as shown in FIG. 3, the strain gauges 3 are attached to the upper end of the diaphragm 21 on an imaginary line L passing through the center 21a of the diaphragm 21. A first pressure resistance element R1, a second pressure resistance element R2, a third pressure resistance element R3, and a fourth pressure resistance element R4 are attached to the upper end of the diaphragm 21 such that the first and second pressure resistance elements R1 and R2 and the third and fourth pressure resistance elements R3 and R4 are positioned symmetrically with respect to the center 21a of the diaphragm 21 and such that the first pressure resistance element R1 and the second pressure resistance element R2 correspond to each other, and the third pressure resistance element R3 and the fourth pressure resistance element R4 correspond to each other.

Preferably, the strain gauges 3 is a semiconductor type strain gauge that exhibits a high gauge rate. A pair of neighboring pressure resistance elements is provided at each of the s strain gauges 3 so as to constitute a single member, and electrodes 31 and 32 protrude between the respective neighboring pressure resistance elements. Existing well known products may be used.

The strain gauges 3 are attached to the upper end of the diaphragm 21 such that the strain gauges 3 are positioned symmetrically with respect to the center of the diaphragm 21, and therefore, the strain gauges 3 have symmetric output values when the diaphragm 21 is deformed. In this specification, the first to fourth pressure resistance elements are sequentially arranged in one direction for the convenience of description.

Structurally, the first pressure resistance element R1 and the fourth pressure resistance element R4 are attached to the upper end of the diaphragm 21 equidistant from the center of the diaphragm 21 such that the first pressure resistance element R1 and the fourth pressure resistance element R4 are positioned symmetrically with respect to the center of the diaphragm 21. In the same manner, the second pressure resistance element R2 and the third pressure resistance element R3 are attached to the upper end of the diaphragm 21 equidistant from the center of the diaphragm 21, which are shorter than in the first pressure resistance element R1 and the fourth pressure resistance element R4, such that the second pressure resistance element R2 and the third pressure resistance element R3 are positioned symmetrically with respect to the center of the diaphragm 21.

Meanwhile, the socket 4 is an insulator to surround the circumference of the diaphragm 21 of the pressure application unit 2 while being spaced apart from the diaphragm 21 by a predetermined distance. The socket 4 includes a receiving passageway 41 corresponding to the upper end of the diaphragm 21.

Figure 6:
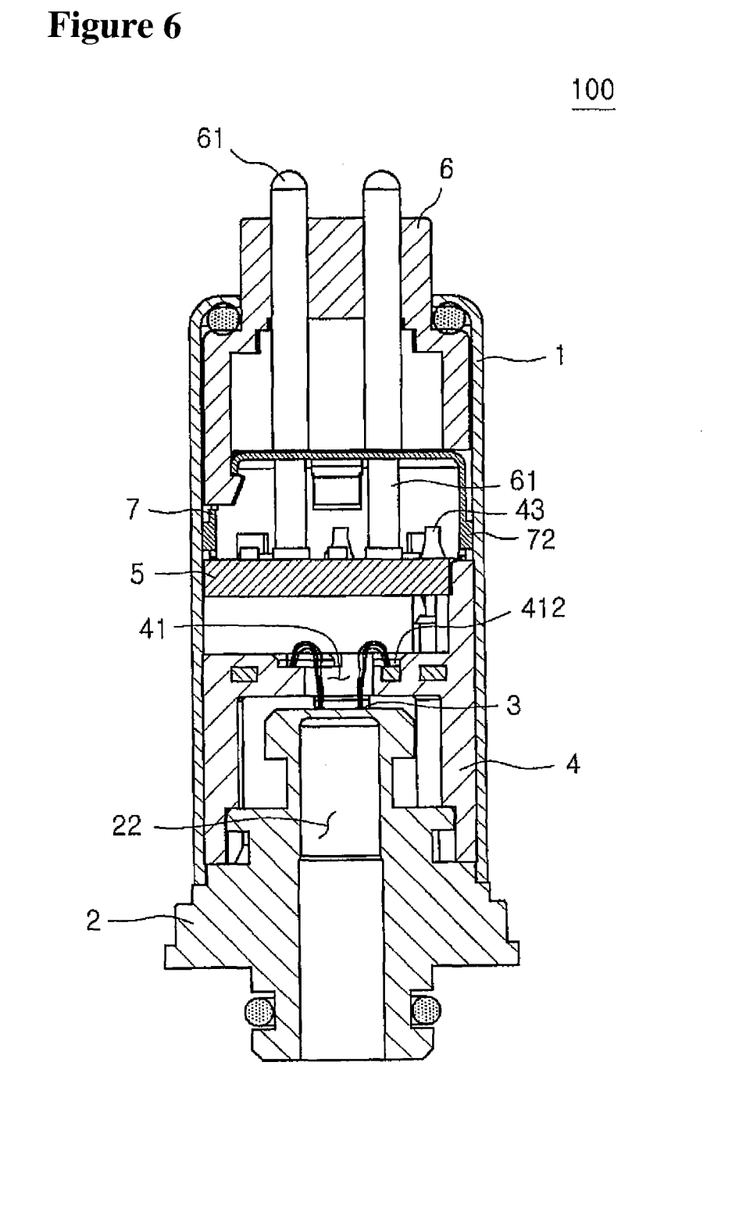
FIG. 6 is a sectional view of the vertical pressure sensor shown in FIG. 1.

That is, as shown in FIG. 6, the socket 4 is formed to surround the upper part of the pressure application unit 2. Also, the socket 4 is spaced apart from the circumference of the diaphragm 21 such that the inside of the socket 4 does not interfere with deformation of the diaphragm 21, which is elastically deformed by external pressure.

The first to fourth electrode terminals 42a, 42b, 42c, and 42d are disposed in the socket 4. The socket 4 may be manufactured by insert injection molding.

Meanwhile, the first to fourth electrode terminals 42a, 42b, 42c, and 42d are electrically connected to the corresponding strain gauges 3 by wire bonding to transmit output values obtained from the strain gauges to the circuit board 5. The first to fourth electrode terminals 42a, 42b, 42c, and 42d are arranged in a Wheatstone bridge circuit pattern.

Specifically, as shown in FIG. 3, the Wheatstone bridge circuit pattern of the first to fourth electrode terminals 42a, 42b, 42c, and 42d is constituted by patterns of the respective electrode terminals disposed in the upper end of the socket 4. One end of each pattern is exposed through the receiving passageway 41 and is connected to a corresponding one of the strain gauges 3 by the wire bonding.

An electrode tip 43 extending upward from each electrode terminal pattern protrudes from the socket 4 and is connected to the circuit board 5 to transmit an output value to the circuit board 5. As shown in FIG. 2, the upper end of each electrode tip 43 may be securely inserted into a corresponding electrode receiving passageway 51.

The receiving passageway 41 of the socket 4 provides a space in which a working tool of an automated wire bonding machine (not shown) performs a welding operation during wire bonding between the strain gauges 3 and the first to fourth electrode terminals 42a, 42b, 42c, and 42d exposed through the receiving passageway 41.

In order to sufficiently secure the working space of the working tool, first and second exposure grooves 411 and 412 may be formed in the receiving passageway. The inner circumference of the receiving passageway is depressed to form the first and second exposure grooves 411 and 412. One end of the electrode terminal is exposed through each of the exposure grooves 411 and 412.

Therefore, the receiving passageway, which is the working space of the working tool, may be formed in a polygonal shape or in a circular shape, with the result that it is possible to easily operate the wire bonding machine.

Figure 4:
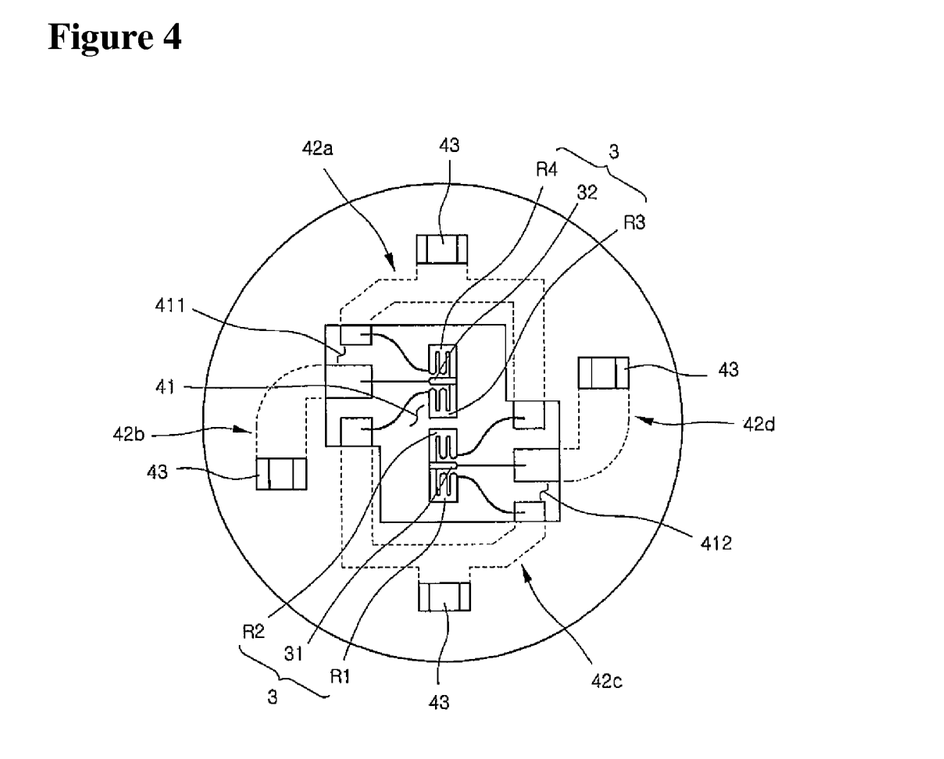
FIG. 4 is an exaggerated plan view of wire bonding between strain gauges and the first to fourth electrode terminals of the vertical pressure sensor according to the invention.
Figure 5:
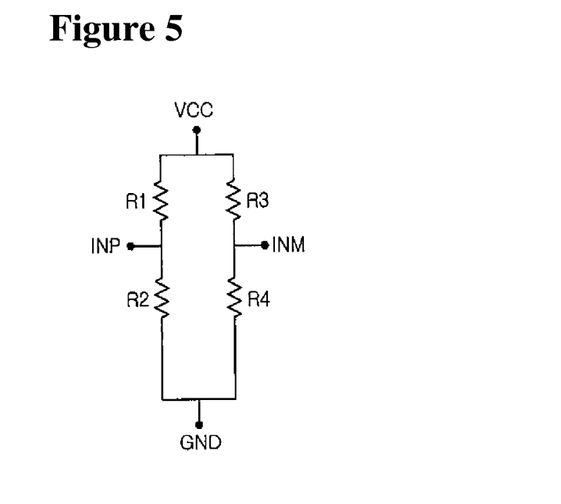
FIG. 5 is a circuit diagram of a Wheatstone bridge corresponding to FIG. 4.

Meanwhile, with respect to FIGS. 4 and 5, the wire bonding between the strain gauges and the first to fourth electrode terminals and a circuit diagram of a Wheatstone bridge is shown.

Corresponding ends of the first and third electrode terminals 42a and 42c, positioned opposite to each other so as to constitute a Wheatstone bridge circuit pattern, are exposed through the first and second exposure grooves 411 and 412, respectively. Also, corresponding ends of the second and fourth electrode terminals 42b and 42d, positioned opposite to each other so as to constitute the Wheatstone bridge circuit pattern, are exposed through the first and second exposure grooves 411 and 412, respectively.

Also, the fourth pressure resistance element R4 and the third pressure resistance element R3 are connected to the first electrode terminal 42a and the third electrode terminal 42c exposed through the first exposure groove 411, respectively. The electrode 32 located between the third pressure resistance element R3 and the fourth pressure resistance element R4 is connected to the second electrode terminal 42b exposed through the first exposure groove 411.

In the same manner, the second pressure resistance element R2 and the first pressure resistance element R1 are connected to the first electrode terminal 42a and the third electrode terminal 42c exposed through the second exposure groove 412, respectively. The electrode 31 located between the first pressure resistance element R1 and the second pressure resistance element R2 is connected to the fourth electrode terminal 42d exposed through the second exposure groove 412.

The first and third electrode terminals 42a and 42c are disposed in the upper end of the socket 4 such that the first and third electrode terminals 42a and 42c are opposite to each other. Each of the first and third electrode terminals 42a and 42c is formed in a horseshoe shape. Corresponding ends of the first and third electrode terminals 42a and 42c are exposed through the first and second exposure grooves 411 and 412, respectively. On the other hand, one end of the second electrode terminal 42b is exposed through the first exposure groove 411. The second electrode terminal 42b is formed independently of the other electrode terminals. In addition, one end of the fourth electrode terminal 42d is exposed through the second exposure groove 412. The fourth electrode terminal 42d is also formed independently of the other electrode terminals.

The pressure resistance elements and the electrodes of the respective strain gauges 3 are connected to the corresponding ends of the respective electrode terminals through the first and second exposure grooves 411 and 412 by wire bonding so as to constitute the Wheatstone bridge.

A relationship between the electrode tips 43 of the respective first to fourth electrode terminals 42a, 42b, 42c, and 42d and the Wheatstone bridge circuit is indicated in

TABLE 1

| Electrode 3 | Nodes of Wheatstone bridge |
|---|---|
| Electrode tip of first electrode terminal | GND |
| Electrode tip of second electrode terminal | INM |
| Electrode tip of third electrode terminal | VCC |
| Electrode tip of fourth electrode terminal | INP |

As described above, the first to fourth electrode terminals 42a, 42b, 42c, and 42d and the strain gauges 3 are connected to each other by wire bonding so as to constitute the Wheatstone bridge circuit pattern.

Meanwhile, the circuit board 5 processes output values received from the respective electrode tips 43 and transmits a pressure value measured by the electrode rods 61 contacting the top of the circuit board 5 to an external device.

Referring to FIGS. 2 and 6 again, the vertical pressure sensor may further include a shielding shell 7 to surround the top of the circuit board 5 so as to improve shielding performance of the circuit board 5.

The shielding shell 7 is open at the lower end thereof. The shielding shell 7 is provided at the upper end thereof with a passage hole having a diameter sufficient for the respective electrode rods 61 to pass through the passage hole without contact between the electrode rods 61 and the passage hole. Also, the bottom 71 of the shielding shell 7 is electrically connected to a ground wire (not shown) of the circuit board 5, and the outer circumference 72 of the shielding shell 7 is electrically connected to the inside of the sensor housing 1, thereby protecting the circuit from external electromagnetic waves.

Hereinafter, the operation of the vertical pressure sensor according to the embodiment of the prevent invention will be described with reference to the accompanying drawings.

The vertical pressure sensor according to the invention is assembled as follows. The upper structure is constituted by coupling the circuit board 5, the shielding shell 7, the electrode rods 61, and the rod housing 6 to one another, and the lower structure is constituted by coupling the pressure application unit 2 and the socket 4 to each other. The upper structure and the lower structure are sequentially inserted into the sensor housing 1 such that the upper structure and the lower structure are fixed in the sensor housing 1.

Mechanical coupling and electrical connection between the upper structure and the lower structure are achieved by mechanically coupling and electrically connecting the electrode tips 43 of the first to fourth electrode terminals 42a, 42b, 42c, and 42d protruding from the socket 4 to the circuit board 5.

As compared with the known pressure sensor, the invention uses the first to fourth electrode terminals in place of the first circuit board, which constitutes a Wheatstone bridge, of the known pressure sensor, with the result that the first circuit board and the elastic terminals may be removed from the vertical pressure sensor. Consequently, a space defined between the upper end of the socket and the circuit board is reduced, and therefore, it is possible to manufacture the vertical pressure sensor in a compact structure.

Also, the structure of the vertical pressure sensor according to the invention is simplified as compared with the known pressure sensor, and therefore, it is possible to reduce effort and time necessary to assemble the vertical pressure sensor, thereby further improving productivity.

In addition, the shielding shell surrounds the upper end of the circuit board while connecting the ground wire of the circuit board and the sensor housing to each other, and therefore, it is possible to improve shielding performance of the circuit board, thereby further improving operation reliability.

Various embodiments have been described in the best mode for carrying out the invention.

According to the invention, the vertical pressure sensor includes the first to fourth electrode terminals connected to the circuit board while constituting the Wheatstone bridge circuit pattern. Consequently, the invention has the effect of reducing the vertical size of the pressure sensor installed at a place having a limited sectional area.

Also, the structure of the vertical pressure sensor according to the invention is simplified as compared with the known pressure sensor, and therefore, it is possible to easily assemble the vertical pressure sensor. Consequently, the invention has the effect of improving productivity. Furthermore, the socket and the electrode terminals are manufactured in a simple rigid structure. Consequently, the invention has the effect of improving stability and safety of the vertical pressure sensor.

In addition, the shielding shell is further provided to improve shielding performance with respect to the circuit board. Consequently, the invention has the effect of reducing a possibility of malfunction due to interference with external electromagnetic waves.

Therefore, the invention has industrial applicability.

Although the embodiments of the invention has been disclosed for illustrative purposes, those skilled in the art will appreciate that various modifications, additions and substitutions are possible, without departing from the scope and spirit of the invention as disclosed in the accompanying claims.

What is claimed is:

1. A vertical pressure sensor comprising:
   a sensor housing;
   a pressure application unit coupled to a lower part of the sensor housing and having diaphragm disposed on an upper end thereof and a plurality of strain gauges attached to a top of the diaphragm;
   a socket surrounding a circumference of the diaphragm such that the socket is spaced apart from the diaphragm by a predetermined distance, the socket having a receiving passageway corresponding to an upper end of the diaphragm;
   a plurality of electrode terminals disposed at an upper end of the socket in a Wheatstone bridge, one end of each of the plurality of electrode terminals exposed through the receiving passageway and electrically connected to a corresponding one of the plurality of strain gauges by wire bonding, another end of each of the plurality of electrode terminals protruding from the upper end of the socket to constitute an electrode tip;
   a circuit board connected to the plurality of electrode terminals and outputting an electrical signal indicative of a measured pressure value; and
   a plurality of electrical signal transmitting electrode rods connected to a top of the circuit board.

2. The vertical pressure sensor according to claim 1, wherein the receiving passageway includes first and second exposure grooves provided at an inner circumference thereof.

3. The vertical pressure sensor according to claim 2, wherein a first and a third electrode terminals of the plurality of electrode terminals are disposed opposite to each other and exposed through a corresponding one of the first and second exposure grooves.

4. The vertical pressure sensor according to claim 3, wherein a second and a fourth electrode terminals of the plurality of electrode terminals are exposed through a corresponding one of the first and second exposure grooves.

5. The vertical pressure sensor according to claim 4, wherein the plurality of strain gauges are attached to the diaphragm along a line passing through a center of the diaphragm.

6. The vertical pressure sensor according to claim 5, wherein the plurality of strain gauges include a first pressure resistance element, a second pressure resistance element, a third pressure resistance element, and a fourth pressure resistance element attached to the diaphragm such that the first and second pressure resistance elements and the third and fourth pressure resistance elements are positioned symmetrically with respect to the center of the diaphragm.

7. The vertical pressure sensor according to claim 6, wherein the first pressure resistance element and the second pressure resistance element correspond to each other, and the third pressure resistance element and the fourth pressure resistance element correspond to each other.

8. The vertical pressure sensor according to claim 7, wherein the fourth pressure resistance element and the third pressure resistance element are connected to the first electrode terminal and the third electrode terminal of the plurality of electrode terminals exposed through the first exposure groove, respectively.

9. The vertical pressure sensor according to claim 8, wherein an electrode located between the third pressure resistance element and the fourth pressure resistance element is connected to the second electrode terminal exposed through the first exposure groove.

10. The vertical pressure sensor according to claim 8, wherein the second pressure resistance element and the first pressure resistance element are connected to the first electrode terminal and the third electrode terminal exposed through the second exposure groove, respectively.

11. The vertical pressure sensor according to claim 10, wherein another electrode disposed between the first pressure resistance element and the second pressure resistance element is connected to the fourth electrode terminal exposed through the second exposure groove.

12. The vertical pressure sensor according to claim 1, further comprising a shielding shell coupled to the circuit board and surrounding a top of the circuit board.

13. The vertical pressure sensor according to claim 12, wherein the shielding shell is electrically connected to a ground wire positioned on a bottom of the circuit board.

14. The vertical pressure sensor according to claim 13, wherein the shielding shell is electrically connected to an inside of the sensor housing.

* * * * *